June 29, 1937.   C. V. AGGERS   2,085,061
VOLTAGE REGULATOR FOR RECTIFIER CIRCUITS
Filed Aug. 25, 1934   3 Sheets-Sheet 1
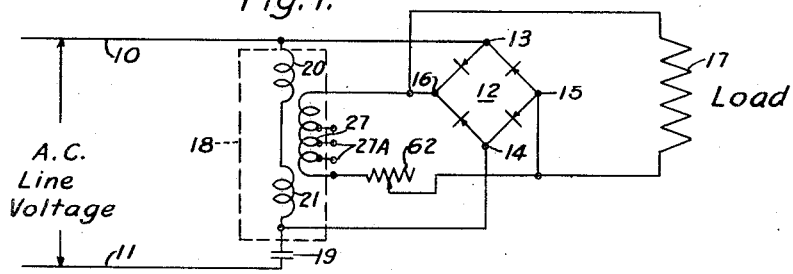
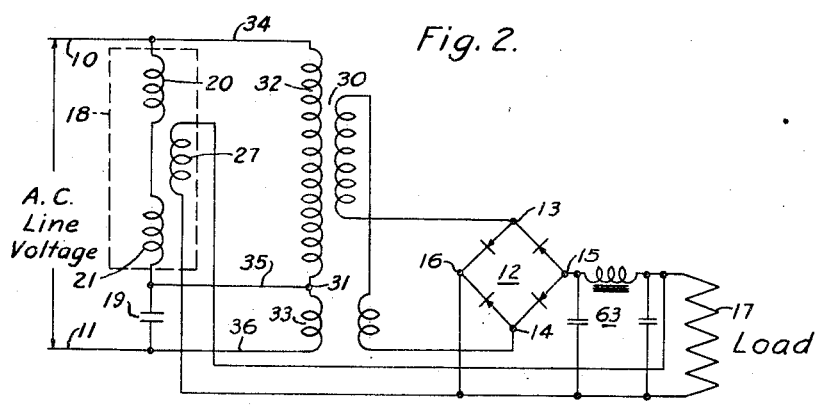
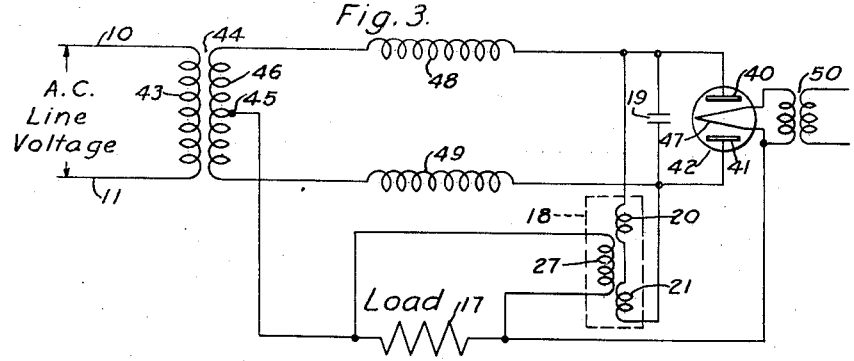
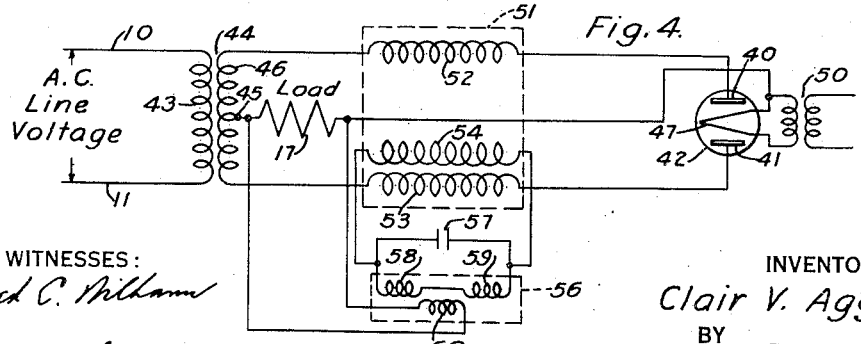
WITNESSES:
INVENTOR
Clair V. Aggers
BY
ATTORNEY June 29, 1937.  C. V. AGGERS  2,085,061
VOLTAGE REGULATOR FOR RECTIFIER CIRCUITS
Filed Aug. 25, 1934  3 Sheets-Sheet 2

WITNESSES:

INVENTOR
Clair V. Aggers
BY
ATTORNEY

June 29, 1937.                C. V. AGGERS                 2,085,061
                VOLTAGE REGULATOR FOR RECTIFIER CIRCUITS
                    Filed Aug. 25, 1934        3 Sheets-Sheet 3
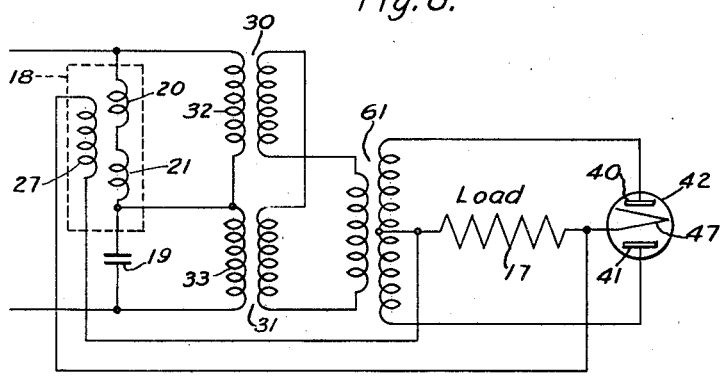
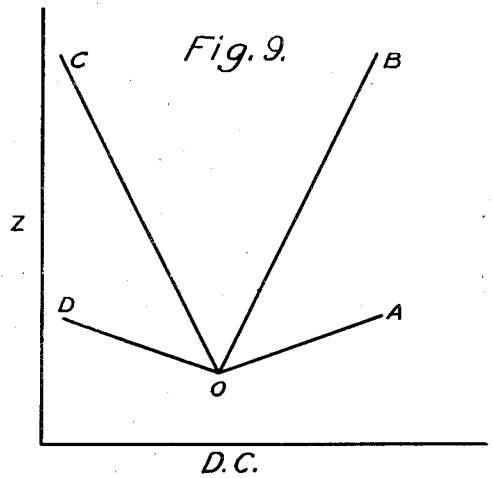
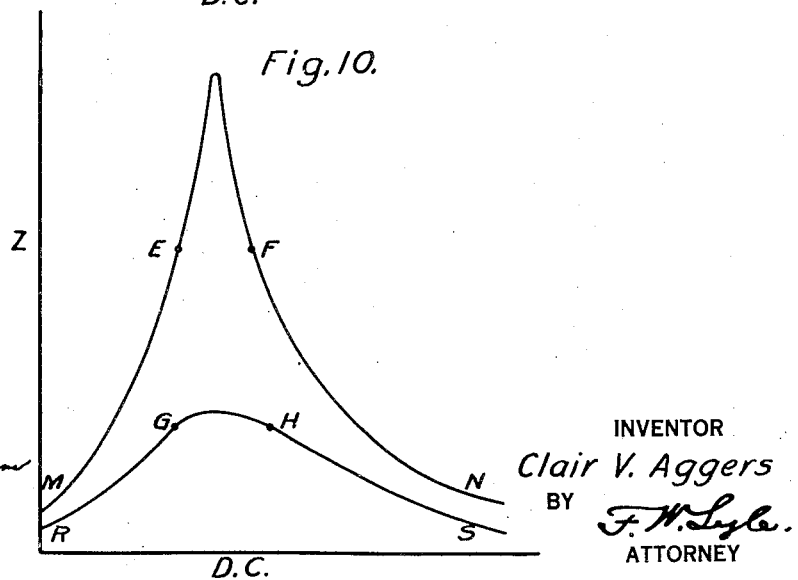
WITNESSES:
INVENTOR
Clair V. Aggers
BY
ATTORNEY Patented June 29, 1937

2,085,061

UNITED STATES PATENT OFFICE 2,085,061

VOLTAGE REGULATOR FOR RECTIFIER CIRCUITS

Clair V. Aggers, Forest Hills, Pa., assignor to Westinghouse Electric & Manufacturing Company, East Pittsburgh, Pa., a corporation of Pennsylvania Application August 25, 1934, Serial No. 741,520

9 Claims. (Cl. 175—363)

My invention relates to voltage regulator circuits and especially to voltage regulators for rectifier circuits.

An object of my invention is to control the input circuit of the rectifier in accordance with variation of conditions in the load circuit.

More specifically stated, it is an object of my invention to automatically provide means for regulating the alternating input voltage to the rectifier so that the voltage in the load circuit may remain constant or vary with change in conditions therein as desired. If the load is a resistance load, my invention can be used to maintain the voltage therein constant regardless of the load. On the other hand, if the load is a battery charging apparatus, it may be desired to have the desired charging current applied to the battery, but, if the battery voltage drops a slight amount, to have a greatly increased charging current applied thereto until the battery becomes charged and then my invention will shut off the charging current when the battery reaches its full voltage. The load can consist of a storage battery, a resistance load, an inductive load or a combination of any or all of these.

Figure 5:
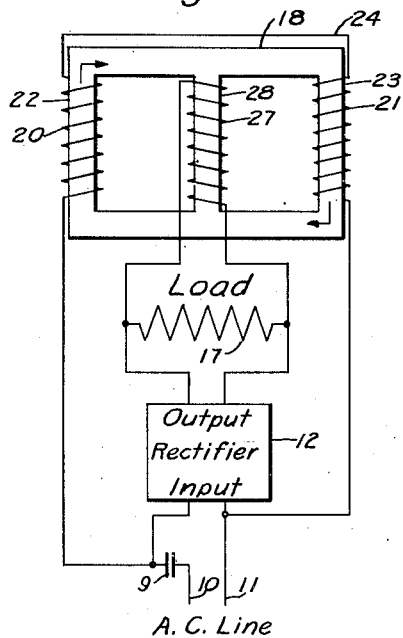
Figure 6:
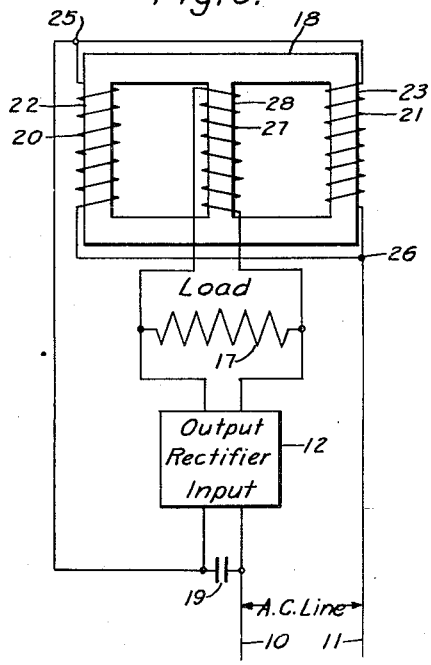
Figure 7:
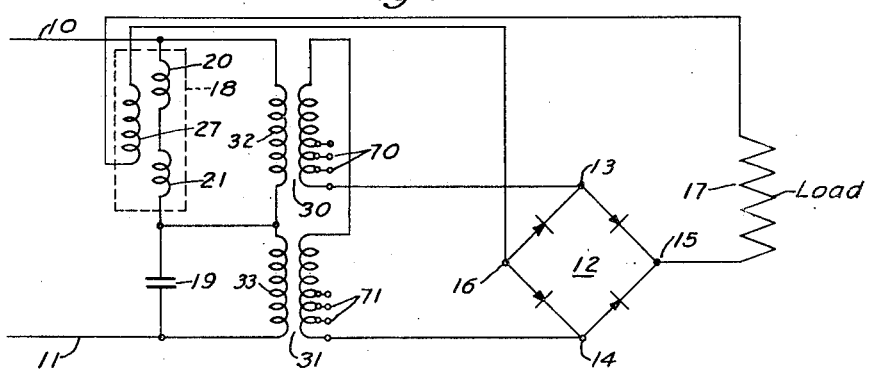

The invention itself, however, both as to its organization and its method of operation, together with additional objects and advantages thereof, will best be understood from the following description of specific embodiments when read in conjunction with the accompanying drawings, in which Figure 1 is a diagrammatic view of a circuit incorporating my invention, in which a direct current coil controls the impedance across the alternating current line, Fig. 2 is a diagrammatic view of a circuit which is a modification of the circuit of Fig. 1, and in which the impedance change in both the reactor and capacitance across the alternating current line is utilized, Fig. 3 is a diagrammatic view of a circuit illustrating a still further modification, in which the inductance is in parallel with the capacitance, Fig. 4 is a diagrammatic view of a still further modification of the invention, in which two reactors are utilized, Fig. 5 is a view partly in elevation and partly diagrammatic of a preferred type of reactor and circuit therefor, especially as illustrated in Fig. 1, Fig. 6 is a view partly in elevation and partly diagrammatic of the reactor circuit of Fig. 5 with certain modifications in the connections thereof, Fig. 7 is a diagrammatic view of a still further modification of my invention, in which the direct-current coil is connected in series with the load, Fig. 8 is a diagrammatic view of a circuit containing a still further modification of my invention, in which a full wave tube rectifier is utilized, Fig. 9 is a curve illustrating the change in impedance for two sets of constants across the inductance and capacitance with variation in the direct current circuit in Figs. 1, 2 and 5 through 8; and, Fig. 10 is a curve illustrating the change of impedance across the inductance and capacitance of Figs. 3 and 4 with a change in the direct current.

As previously stated, my invention concerns the regulation of voltage in a rectifier circuit. The form of the rectifier may be the well known bridge for contact rectifiers or may be the full-wave tube rectifier or may, of course, be just a single contact or half-wave tube rectifier. Variations will occur in the load circuit of this rectifier circuit, and I desire to automatically compensate for the variations in the load circuit. In general, I prefer to have a direct-current coil connected to an impedance in the alternating-current side of the line so that the variations in the direct-current load circuit will be applied to this impedance in the alternating-current circuit and automatically change the voltage applied to the rectifier to compensate for the variations in the direct-current circuit.

In Fig. 1, I have illustrated the alternating-current circuit represented by the lines 10 and 11 as applied to a rectifier 12. This rectifier 12 may be of any suitable construction but, as illustrated, consists of the well-known bridge of four contact rectifiers having the input connections 13 and 14 and the direct-current output connections 15 and 16 to the load 17.

I preferably place across the alternating-current circuit an impedance preferably consisting of an inductance 18 and a capacitance 19. The inductance 18 preferably consists of a saturable reactor and the form of this reactor is preferably of the three-legged type illustrated in Fig. 5. Other types of reactors including those with more legs may be used. Two alternating-current coils 20 and 21 are preferably placed on two of the legs 22 and 23 of this reactor. These alternating-current coils may be connected in series, as illustrated at 24 in Fig. 5, or in parallel, as illustrated at 25, 26 in Fig. 6. The input circuit 13 and 14 to the rectifier 12 may be connected to the alternating-current line voltage in shunt with the coils 20 and 21, as illustrated in Figs. 1 and 5, or in shunt with the capacitance 19, as illustrated in Fig. 6. Connected with the inductance 18 is a direct-current coil 27 preferably surrounding the third or middle leg 28 of the reactor 18. This coil is preferably in shunt with the direct-current load, as illustrated in Figs. 1, 5 and 6. Taps 27A can be taken from this coil 27 to provide any necessary adjustment. It is also to be understood that similar taps can be taken from the other coils disclosed in the various circuits where desired. A variable resistance 62 may also be used for regulation in this circuit and the other circuits of any of the figures where desired.

The values of the inductance 18 and the capacitance 19 are preferably such that they are near resonance for the desired voltage in the load 17. The reactor 18, as previously mentioned, is preferably a saturable reactor. The curve BOC in Fig. 9 illustrates the variation of the impedance across the reactor 18 and capacitance 19 with variation of the direct current and AOD represents the change of impedance with different constants in the reactor 18 and capacitance 19. When the load increases or the voltage drops due to conditions therein, and the apparatus is set to work on the line OB of Fig. 9, the inductance of the coil 27 will decrease with the result that the impedance of the reactor 18 and the capacitance 19 will change and have a higher potential drop therethrough. This will result in a corresponding increased voltage drop on the rectifier 12, so that the output thereof will increase and compensate for the decrease of voltage in the load circuit.

As disclosed in Fig. 9, the slope of the line OB is rather steep so that a small drop in the direct current will produce a much larger or amplified drop in the impedance. The constants of the reactor may be chosen, however, so that the curve AOD represents the variation of impedance with variation of the direct current. In this case the change of impedance is very much smaller with a corresponding change in the direct current. By properly designing the constants of the reactor, any desired slope of the curve can be made. If desired, the apparatus may work on the line OC or OD with the result that a decrease in the direct current will result in an increase in the impedance.

In Fig. 2 are illustrated the alternating current input circuits 10 and 11, reactor 18, capacitance 19, rectifier 12 and load circuit 17 having a coil 27 in shunt therewith connected to the reactor 18, as previously described in connection with Fig. 1. Two transformers 30 and 31 are placed between the rectifier 12 and the alternating current lines 10 and 11 with the primary coil 32 of transformer 30 connected in parallel with the reactor 18 and the primary coil 33 of transformer 31 connected in parallel with the capacitance 19 by means of the connections 34, 35 and 36. By inserting these two transformers 30 and 31 or their equivalent, the change in impedance through both the reactor 18 and the capacitance 19 are utilized in changing the input to the rectifier 12 instead of just the change in the impedance of the reactor 18 in Figs. 1 and 5 or of the capacitance 19, as in Fig. 6.

If the current or voltage or both need smoothing in this or any of the other circuits, a filter 63 of any well-known construction may be used although such use is not essential to the operation of my device.

In Fig. 3, I have illustrated a still further modification in which the saturable reactor 18 is placed in parallel with the capacitance 19 and the two anodes 40 and 41 of a full wave rectifier tube 42. The input circuit consists of the primary coil 43 of the transformer 44 having the mid-point 45 of its secondary 46 connected to the load 17 and in series with the cathode 47. Two anode reactors 48 and 49 are connected in series with the anodes of the tube 42. The cathode 47 of the tube is of course heated with any desirable heating circuit 50. The direct-current coil 27 is preferably connected in shunt with the load 17 and operates to change the impedance of the reactor 18.

The reactor 18 in this arrangement does not carry the full current but only a control current and so can be made much less rugged than the reactors of Figs. 1 and 2.

In Fig. 10 is illustrated a graph disclosing the change in impedance of the reactor 18 and the capacitance 19 with variations in the direct current in the structure of Figs. 3 and 4. The curve MN represents the variation where the constants of the circuit have been selected for a large change in impedance in response to a small change in direct current while the curve RS represents where the constants of the circuit have been selected to that amount of change in impedance corresponds or more nearly corresponds to the amount of change in direct current. These two curves have been given as representative of two rather extreme sets of constants. Any intermediate or still further extreme curve may be selected.

If the point E on MN be selected as the working point, a decrease in direct current will result in a large decrease in impedance and an increase in direct current will result in a large increase in impedance. If, on the other hand, the point F is selected, then a decrease in direct current will result in a large increase in impedance and an increase in direct current will result in a large decrease in impedance.

The type MN of working curve is especially suitable for battery charging circuits where a trickle charge is being applied. If the battery voltage falls below normal, a full charge is automatically applied by the rectifier while, if the battery voltage reaches full strength, the charge automatically tapers off.

On the other hand, if a curve like RS is selected, the change in the amount of impedance corresponds with the change in direct current if points like G and H are selected. This type of curve is especially suitable for resistance loads where it is desired to maintain the voltage constant. Any variation in the direct current load is compensated by a corresponding variation in the alternating current circuit.

Fig. 4 discloses a somewhat similar system to Fig. 3, except that a three-legged reactor 51 is placed in series with the anodes 40 and 41 of the rectifier 42, as illustrated. The two coils 52 and 53 are connected between the two anodes and the secondary 46 of the input transformer 44. The third coil 54 is connected to another three-legged reactor 56 in parallel with the capacitance 57. This three-legged reactor has the two coils 58 and 59 in the circuit and then has the direct current coil 60 around its third leg connected in shunt with the load 17. The direct current coil 60 on the reactor 56 varies the impedance of the parallel circuit of the inductance of the reactor 56, and the capacitance 57 in accordance with the variations in the load 17 and this change in impedance, in turn, controls the impedance of the three-legged reactor 51 to control the input on the tube 42. The curves and explanation thereof in Fig. 10 apply likewise to this circuit.

In Fig. 7, I have illustrated a circuit somewhat similar to that of Fig. 2, except that the direct current coil 27 is connected in series with the load 17 instead of in shunt therewith.

This system can be used where it is desired to maintain a constant current such as desirable in the excitation circuit of direct current generators. This characteristic can be given any desired droop by several means, the most practical one being taps 70, 71 on the secondaries of the transformers 30 and 31 to change the transformer ratios.

In Fig. 8, I have illustrated a circuit somewhat similar to Fig. 2, except that a full-wave rectifier tube 42 is utilized in place of the contact rectifier bridge 12 illustrated therein. In view of the use of this tube, an additional transformer 61 is used so as to connect the load to the midpoint of the transformer circuit of the two transformers 30 and 31.

Although I have shown and described certain specific embodiments of my invention, I am fully aware that many modifications thereof are possible. My invention, therefore, is not to be restricted except as is necessitated by the prior art.

I claim as my invention:

1. In combination with a rectifier interconnecting an alternating current circuit with a direct current circuit, an inductance and capacitance serially connected in shunt with said alternating current circuit and means in shunt with said direct current circuit controlling the impedance of said inductance and capacitance in accordance with variations in said direct current circuit.

2. In combination with a rectifier interconnecting an alternating current circuit with a direct current circuit, an inductance and capacitance having values near resonance for the desired current value in said direct current circuit, serially connected in shunt with said alternating current circuit and means in shunt with said direct current circuit controlling the impedance of said inductance and capacitance in accordance with variations in said direct current circuit.

3. In combination with a rectifier interconnecting an alternating current circuit with a direct current circuit, an inductance and capacitance serially connected together, said inductance and capacitance being in shunt with said alternating circuit and its connections to said rectifier and means connected with said direct current circuit controling the impedance of said inductance and capacitance in accordance with variations in said direct current circuit.

4. In combination with a rectifier interconnecting an alternating current circuit with a direct current circuit, an inductance and capacitance having values near resonance for the desired voltage value in said direct current circuit, serially connected together, said inductance and capacitance being in shunt with said alternating circuit and its connections to said rectifier and means connected with said direct current circuit controlling the impedance of said inductance and capacitance.

5. In combination, an alternating-current supply line, a transformer having its primary coils connected to said supply line, an inductance and capacitance in series with each other across said alternating-current supply line in shunt with the primary coils of said transformer, a rectifier bridge having its input terminals connected to the secondary of said transformer, a direct-current load circuit connected to the output terminals of said rectifier bridge and means in shunt with said direct-current load circuit controlling the impedance of said inductance and capacitance in accordance with variations in said direct-current circuit.

6. In combination, an alternating-current supply line, two reactances of different sign connected in series with each other across said supply line, a transformer primary shunting at least a portion of one of said reactances, a rectifier connected to be supplied from the secondary of said transformer, and means to vary one of said reactances in accordance with an electrical characteristic of the output of said rectifier.

7. In combination, an alternating-current supply line, two reactances of different sign connected in series with each other across said supply line, a transformer primary shunting at least a portion of one of said reactances, a second transformer primary shunting at least a portion of the other of said reactances, means for connecting the secondary windings of said transformers in series with each other to supply current to a rectifier, and means to vary one of said reactances in accordance with an electrical characteristic of the output of said rectifier.

8. In combination, an alternating-current supply line, two impedances of different sign connected in series with each other across said supply line, a transformer primary shunting at least a portion of one of said impedances, a rectifier connected to be supplied from the secondary of said transformer, and means to vary one of said impedances in accordance with the voltage output of said rectifier.

9. In combination, an alternating-current supply line, two impedances of different sign connected in series with each other across said supply line, a transformer primary shunting at least a portion of one of said impedances, a second transformer primary shunting at least a portion of the other of said impedances, means for connecting the secondary windings of said transformers in series with each other to supply current to a rectifier, and means to vary one of said impedances in accordance with the voltage output of said rectifier.

CLAIR V. AGGERS.